(12) United States Patent
Smith et al.

(10) Patent No.: US 9,951,181 B2
(45) Date of Patent: Apr. 24, 2018

(54) POLYAMIDES CONTAINING THE BIO-BASED 2,5-FURANDICARBOXYLIC ACID

(71) Applicant: Furanix Technologies B.V., Amsterdam (NL)

(72) Inventors: DeeDee Smith, Dacula, GA (US); Joel Flores, Alpharetta, GA (US); René Aberson, Amersfoort (NL); Matheus Adrianus Dam, Beverwijk (NL); Ate Duursma, Amersfoort (NL); Gerardus Johannes M. Gruter, Heemstede (NL)

(73) Assignee: Synvina C.V., Amsterdam (NL)

( * ) Notice: Subject to any disclaimer, the term of this patent is extended or adjusted under 35 U.S.C. 154(b) by 0 days.

(21) Appl. No.: 15/030,404

(22) PCT Filed: Oct. 17, 2014

(86) PCT No.: PCT/EP2014/072310
§ 371 (c)(1),
(2) Date: Apr. 19, 2016

(87) PCT Pub. No.: WO2015/059047
PCT Pub. Date: Apr. 30, 2015

(65) Prior Publication Data
US 2016/0251479 A1 Sep. 1, 2016

Related U.S. Application Data

(60) Provisional application No. 61/893,414, filed on Oct. 21, 2013.

(51) Int. Cl.
| | |
|---|---|
| *C08G 69/26* | (2006.01) |
| *C08G 69/28* | (2006.01) |
| *C08L 77/06* | (2006.01) |
| *C09D 177/06* | (2006.01) |

(52) U.S. Cl.
CPC .......... *C08G 69/265* (2013.01); *C08G 69/28* (2013.01); *C08L 77/06* (2013.01); *C09D 177/06* (2013.01)

(58) Field of Classification Search
CPC ...... C08G 69/26; C08G 69/28; C08J 2377/06; C08J 5/18; C08K 11/00; C08L 77/06; C09D 177/06
See application file for complete search history.

(56) References Cited

U.S. PATENT DOCUMENTS

2014/0228523 A1 8/2014 Kim et al.

FOREIGN PATENT DOCUMENTS

| CN | 102311546 A | 1/2012 |
|---|---|---|
| CN | 102850541 A | 1/2013 |
| CN | 103113577 A | 5/2013 |
| WO | 2012/132792 A1 | 10/2012 |
| WO | 2013/149180 A1 | 10/2013 |

OTHER PUBLICATIONS

Shen et al. Machine Translation of CN 103113577, May 22, 2013, p. 1-8.*
XP-002734015, Thomson Scientific, Dec. 22, 2014.
XP-002734014, Thomson Scientific, Dec. 22, 2014.

* cited by examiner

*Primary Examiner* — Robert T Butcher
(74) *Attorney, Agent, or Firm* — Hoffmann & Baron, LLP

(57) ABSTRACT

Polyamides are made from the polycondensation of monomers including from 15 to 80 mol % of 2,5-furandicarboxylic acid (FDCA), from 20 to 85 mol % of at least one aromatic dicarboxylic acid and from 50 to 100 mol % of at least one aliphatic diamine selected from those including 6 and 7 carbon atoms. A process allowing the synthesis of high molecular weight polyamides made from the above mentioned monomers is also described. Finally, compositions and articles including the same polyamides are also disclosed.

15 Claims, No Drawings

POLYAMIDES CONTAINING THE BIO-BASED 2,5-FURANDICARBOXYLIC ACID

CROSS-REFERENCE TO RELATED APPLICATIONS

This application is the National Stage of International Application No. PCT/EP2014/072310 filed Oct. 17, 2014, which claims the benefit of U.S. provisional application No. 61/893,414 filed Oct. 21, 2013, the whole content of this application being incorporated by reference for all purposes.

TECHNICAL FIELD

The present invention relates to new polyamides made from the polycondensation of monomers comprising 2,5-furandicarboxylic acid (FDCA), other aromatic dicarboxylic acid(s) and one or more aliphatic diamines, and also to compositions and articles comprising the same. Another aspect of the present invention is directed to a new process for making said polyamide allowing the obtention of high molecular weight polymers.

BACKGROUND ART

Aromatic polyamides have been used for many years in various applications where their outstanding properties are valued. However, in the last decade, a growing trend to use plastics derived from renewable resources such as plants has been established by the society in order to reduce human's carbon footprint and shift our civilization to be more environmentally-friendly. This trend translated into a huge number of projects in both the academic and industrial scientific communities. However, finding polymers reaching interesting properties while being made via affordable bio-sourced monomers and processes is not an easy task. Both Assignees of the present application develop and supply products that meet the sustainable development challenges their customers are facing and have been working hand in hand to innovate in this demanding area.

SOLVAY SPECIALTY POLYMER USA, L.L.C. is a leading company in the manufacture of high performance polymers which notably produces a wide range of aromatic polyamides under the trade name AMODEL® polyamides.

AVANTIUM has developed a new technology which now makes available the conversion of plant-based sugars into furanic building blocks in a cost-competitive way. The main building block obtained, 2,5-furandicarboxylic acid (hereafter referred to as FDCA), can be used as a monomer in polycondensation reactions:

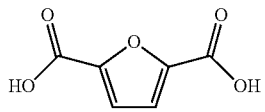 [SMILES: O=C(O)c1ccc(C(=O)O)o1]

Various proposals have been made to synthesize polyamides made from FDCA in the literature. However, the inventors have discovered that none of the experiments and the products described could be satisfactorily reproduced.

CN 102311546A discloses polyamide resins made from terephthalic acid, a furan dicarboxylic acid such as FDCA, a diamine comprising 1,10-decanediamine and optionally another aliphatic diamine comprising at least 8 carbon atoms. This document discloses several examples and comparative examples of polymers, among which comparative example 4 relating to a "1,10-decanediamine-free" polymer made from terephthalic acid, FDCA, 5-hydroxy isophthalic acid (with a respective 70/5/25 molar ratio) and hexamethylene diamine. Interestingly, the polymer obtained features a melting temperature (Tm) of 220° C. only, which appears to be very low for anyone skilled in the art of aromatic polyamides.

CN 102850541A discloses polyamide made from FDCA, terephthalic acid, 1,10-decanediamine and up to 30 mol % of another diamine comprising 4 or more carbon atoms. Interestingly, CN'541 states in [0014] that the presence of more than 30 mol % of those diamine different from 1,10-decanediamine is detrimental to the properties of the polyamide, in particular underlining the effect on the Tm and Tg of the polymers obtained (with a Tm of below 220° C.).

WO 2012/132792 relates to polyamides made from FDCA and an aliphatic mine comprising 2 or 3 carbon atoms, i.e. ethylenediamine or 1,3-propylenediamine. WO'792 discloses high molecular weight polymers made by a two-step process using interfacial polymerization and low molecular weight polymers made by a more conventional polycondensation reaction in the presence of water.

There is thus still a need for a process allowing the obtention of high molecular weight polymers made from bio-sourced monomers featuring interesting thermal and mechanical properties.

SUMMARY OF THE INVENTION

A first aspect of the present invention is thus related to a polyamide (P) made from the polycondensation of monomers comprising:
(i) a dicarboxylic acid component comprising:
   from 15 to 80 mol % of 2,5-furandicarboxylic acid (FDCA) or derivative thereof,
   from 20 to 85 mol % of at least one aromatic dicarboxylic acid, different from the above mentioned FDCA, or derivative thereof, based on the total number of moles of dicarboxylic acids, and
(ii) a diamine component comprising from 50 to 100 mol %, based on the total number of moles of diamines, of at least one aliphatic diamine selected from those comprising 6 and 7 carbon atoms.

The inventors of the present invention have discovered that the polymerization of FDCA is not straightforward and requires specific conditions not disclosed in the prior art, which enable the production of high molecular weight polymers.

The inventors tried to reproduce the prior art polymerization conditions of FDCA and were not successful. Rather, they discovered that the use of an ester derivative of FDCA, in particular the dimethylester FDCA in a process where the temperature was strictly controlled allowed the manufacture of high molecular weight FDCA-based polymers. In particular, they found that the reaction medium was to be maintained in a first step at a temperature of at most 100° C. during the polymerization of the FDCA (or its derivative) and that this was a key parameter to obtain high molecular weight polymers.

Therefore, a second aspect of the present invention is related to a process for making the above mentioned polyamide (P) comprising a step where the FDCA or any of its derivatives and the at least one aliphatic diamine or any of its derivatives are reacted together at a temperature of at most 100° C. to obtain a prepolymer having advantageously a number average molecular weight (Mn) of at least 500 Da when estimated by $^1$H-NMR.

A third aspect of the present invention is related to a composition comprising the above mentioned polyamide (P).

Finally, a fourth aspect of the present invention is related to articles comprising the same polyamide (P) such as shaped articles, fibers, coatings, films and membranes.

DETAILED DESCRIPTION OF THE INVENTION

The expression "polyamide" is intended to denote any polymer which comprises recurring units which are derived from the polycondensation of at least one dicarboxylic acid component (or derivative thereof) and at least one diamine component, and/or from the polycondensation of aminocarboxylic acids and/or lactams. In certain preferred embodiments, the polyamide (P) of the present invention comprises at least 50 mol %, preferably at least 60 mol %, more preferably at least 70 mol %, still more preferably at least 80 mol % and most preferably at least 90 mol % of such recurring units. Excellent results were obtained when the polyamide (P) consisted of such recurring units.

The expression "derivative thereof" when used in combination with the expression "dicarboxylic acid" is intended to denote whichever derivative which is susceptible of reacting in polycondensation conditions to yield an amide bond. Examples of amide-forming derivatives include a mono- or di-alkyl ester, such as a mono- or di-methyl, ethyl or propyl ester, of such carboxylic acid; a mono- or di-aryl ester thereof; a mono- or di-acid halide thereof; a carboxylic anhydride thereof and a mono- or di-acid amide thereof, a mono- or di-carboxylate salt.

The polyamide (P) is an aromatic polyamide polymer made from a dicarboxylic acid component comprising FDCA and aromatic dicarboxylic acid(s), or any derivative thereof, different from the above mentioned FDCA.

For the purpose of the present invention, the expression "aromatic polyamide polymer" is intended to denote a polyamide which comprises more than 35 mol %, preferably more than 45 mol %, more preferably more than 55 mol %, still more preferably more than 65 mol % and most preferably more than 75 mol % of recurring units which are aromatic recurring units.

For the purpose of the present invention, the expression "aromatic recurring unit" is intended to denote any recurring unit that comprises at least one aromatic group. The aromatic recurring units may be formed by the polycondensation of at least one aromatic dicarboxylic acid with an aliphatic diamine or by the polycondensation of at least one aliphatic dicarboxylic acid with an aromatic diamine, or by the polycondensation of aromatic aminocarboxylic acids.

For the purpose of the present invention, a dicarboxylic acid or a diamine is considered as "aromatic" when it comprises one or more than one aromatic group.

The polyimide (P) is made from the polycondensation of monomers comprising:
(i) a dicarboxylic acid component comprising:
  from 15 to 80 mol % of 2,5-furandicarboxylic acid (FDCA)) or derivative thereof,
  from 20 to 85 mol % of at least one aromatic dicarboxylic acid or derivative thereof, different from the above mentioned FDCA, based on the total number of moles of dicarboxylic acids, and
(ii) a diamine component comprising from 50 to 100 mol %, based on the total number of moles of diamines, of at least one aliphatic diamine selected from those comprising 6 and 7 carbon atoms.

The FDCA (or derivative thereof) is present in the dicarboxylic acid component in an amount of at least 15 mol %, based on the total number of moles of dicarboxylic acids, preferably of at least 18 mol %, more preferably at least 20 mol %, still more preferably at least 22 mol %, even more preferably at least 25 mol %. The FDCA (or derivative thereof) is also present in an amount of at most 80 mol %, based on the total number of moles of dicarboxylic acids, preferably of at most 78 mol %, more preferably at most 75 mol %, still more preferably at most 70 mol %, even more preferably at most 65 mol %.

The at least one aromatic dicarboxylic acid, different from the above mentioned FDCA, is present in the dicarboxylic acid component in an amount of at least 20 mol %, based on the total number of moles of dicarboxylic acids, preferably of at least 25 mol %, more preferably at least 30 mol %, still more preferably at least 35 mol %, even more preferably at least 40 mol %. The at least one aromatic dicarboxylic acid, different from the above mentioned FDCA, is also present in an amount of at most 85 mol %, based on the total number of moles of dicarboxylic acids, preferably of at most 83 mol %, more preferably at most 82 mol %, still more preferably at most 80 mol %, even more preferably at most 75 mol %.

Non limitative examples of aromatic dicarboxylic acids are notably phthalic acids, including isophthalic acid (IA), terephthalic acid (TA) and orthophthalic acid (OA), 2,5-pyridinedicarboxylic acid, 2,4-pyridinedicarboxylic acid, 3,5-pyridinedicarboxylic acid, 2,2-bis(4-carboxyphenyl) propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene, the 2,6-naphthalene dicarboxylic acid, 2,7-naphthalene dicarboxylic acid, 1,4-naphthalene dicarboxylic acid, 2,3-naphthalene dicarboxylic acid, 1,8-naphthalene dicarboxylic acid, 1,2-naphthalene dicarboxylic acid and their derivatives.

The dicarboxylic acid component may comprise optionally, in addition to the FDCA, aromatic dicarboxylic acid or derivatives thereof, other dicarboxylic acids such as aliphatic dicarboxylic acids. Among them, mention can be notably made of oxalic acid [HOOC—COOH, malonic acid (HOOC—$CH_2$—COOH), adipic acid [HOOC—$(CH_2)_4$—COOH], succinic acid [HOOC—$(CH_2)_2$—COOH], glutaric acid [HOOC—$(CH_2)_3$—COOH], 2,2-dimethyl-glutaric acid [HOOC—$C(CH_3)_2$—$(CH_2)_2$—COOH], 2,4,4-trimethyl-adipic acid [HOOC—$CH(CH_3)$—$CH_2$—$C(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecanedioic acid [HOOC—$(CH_2)_{10}$—COOH], tetradecanedioic acid [HOOC—$(CH_2)_{12}$—COOH], cis- and/or trans-cyclohexane-1,4-dicarboxylic acid and/or cis- and/or trans-cyclohexane-1,3-dicarboxylic acid (CHDA).

The at least one aliphatic diamine comprising 6 and 7 carbon atoms is present in the diamine component in an amount of at least 50 mol %, based on the total number of moles of diamines present, preferably of at least 60 mol %, more preferably at least 70 mol %, still more preferably at least 80 mol %, even more preferably at least 90 mol %.

Excellent results were obtained when the diamine component was an aliphatic diamine comprising 6 or 7 carbon atoms.

Non limitative examples of aliphatic diamine comprising 6 and 7 carbon atoms are notably selected from the group consisting of 1,6-diaminohexane (or hexamethylene diamine), 1,7-diaminoheptane, 1,4-diaminocyclohexane, 1,2-diaminocyclohexane and 2-methylpentamethylenediamine.

Excellent results were obtained when said aliphatic diamine comprised 6 carbon atoms.

The diamine component may comprise optionally, in addition to the above mentioned aliphatic diamine comprising 6 and 7 carbon atoms, other diamines such as (cyclo) aliphatic diamines comprising from 2 to 5 and/or from 8 to 18 carbon atoms and aromatic diamines.

Non limitative examples of aliphatic diamines comprising from 2 to 5 and/or from 8 to 18 carbon atoms, mention can be notably made of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane and 1,12-diaminododecane.

Also, the aliphatic diamine may be chosen from cycloaliphatic diamines such as isophorone diamine (also known as 5-amino-(1-aminomethyl)-1,3,3-trimethylcyclohexane), 1,3-cyclohexanebis(methylamine) (1,3-BAMC), 1,4-cyclohexanebis(methylamine) (1,4-BAMC), 4,4-diaminodicyclohexylmethane (PACM), and bis(4-amino-3-methylcyclohexyl)methane.

If present, the aliphatic diamine, different from the aliphatic diamine selected from those comprising 6 and 7 carbon atoms, is preferably selected from the group consisting of 1,9-diaminononane, 1,10-diaminodecane, 1,11-diaminoundecane and 1,12-diaminododecane.

Among aromatic diamines, mention can be notably made of meta-phenylene diamine (MPD), para-phenylene diamine (PPD), 3,4'-diaminodiphenyl ether (3,4'-ODA), 4,4'-diaminodiphenyl ether (4,4'-ODA), meta-xylylene diamine (MXDA), and para-xylylene diamine (PXDA).

If present, the aromatic diamine is preferably meta-xylylene diamine (MXDA).

In addition to the above mentioned a dicarboxylic acids and diamines, the polyamide (P) can be made from the polycondensation of other monomers such as aromatic or aliphatic aminocarboxylic acids or derivatives thereof. They can notably be selected from the group consisting of 4-(aminomethyl)benzoic acid and 4-aminobenzoic acid, 6-aminohexanoic acid, 1-aza-2-cyclononanone, 1-aza-2-cyclododecanone, 11-aminoundecanoic acid, 12-aminododecanoic acid, 4-(aminomethyl)benzoic acid, cis-4-(aminomethyl)cyclohexanecarboxylic acid, trans-4-(aminomethyl)cyclohexanecarboxylic acid, cis-4-aminocyclohexanecarboxylic acid and trans-4-aminocyclohexanecarboxylic acid.

A second aspect of the present invention is related to a process very well suited for making the above mentioned polyamide (P) from monomers comprising
(i) a dicarboxylic acid component comprising:
   from 15 to 80 mol % of 2,5-furandicarboxylic acid (FDCA) or derivative thereof,
   from 20 to 85 mol % of at least one aromatic dicarboxylic acid or derivative thereof, based on the total number of moles of dicarboxylic acids, and
(ii) a diamine component comprising from 50 to 100 mol %, based on the total number of moles of diamines, of at least one aliphatic diamine selected from those comprising 6 and 7 carbon atoms.

The polymerization of FDCA is not an easy task, mainly due to the decarboxylation of the FDCA at the high temperatures at which polyamides are usually manufactured. The first attempts to polymerize FDCA were not successful and lead to the synthesis of very low molecular weight polymers. The inventors found out that a process comprising a step where the FDCA or its derivative and the aliphatic (hairline are reacted together at a temperature of at most 100° C. to first obtain a prepolymer was a way to overcome the above mentioned problems.

Excellent results were obtained when a derivative of FDCA was used. The process according to the present invention comprises thus a step where the FDCA or any of its derivatives and the at least one aliphatic diamine or any of its derivatives are reacted together at a temperature of at most 100° C. to obtain a prepolymer. The so-obtained prepolymer has a number average molecular weight (Mn) of at least 500 Da when determined by $^1$H-NMR.

The derivative of FDCA is preferably selected from the group consisting of the diethyl ester, the dimethyl ester, the dipropyl ester of 2,5-furandicarboxylic acid. Most preferably, it is the dimethyl ester of 2,5-furandicarboxylic acid (DMFDCA), represented by the formula below:

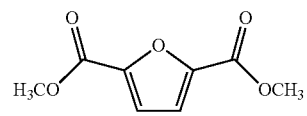 [SMILES: COC(=O)c1ccc(C(=O)OC)o1]

According to preferred embodiments of the present invention, the at least one aromatic dicarboxylic acid of the dicarboxylic acid component is preferably a phthalic acid selected from the group consisting of isophthalic acid (IA), and terephthalic acid (TA). Isophthalic acid and terephthalic acid can be used alone or in combination. The phthalic acid is preferably terephthalic acid (or its derivative), optionally in combination with isophthalic acid (or its derivative). Excellent results were obtained when acid chlorides of phthalic acids were used, like terephthaloyl chloride.

In particular, the process according to the present invention comprises advantageously two distinct steps:
  in a first step, a prepolymer is synthesized by the reaction of a di-ester of FDCA, being preferably the dimethyl ester of 2,5-furandicarboxylic acid (DMFDCA), with at least one aliphatic diamine selected from those comprising 6 and 7 carbon atoms in a second step, the prepolymer obtained in the first step is reacted with the aromatic dicarboxylic acid or a derivative thereof, different from the above mentioned FDCA, being preferably the acid chloride of the aromatic dicarboxylic acid to obtain the final polyamide (P).

The prepolymer synthesized in the first step may act as a monomer, and in particular as a diamine, since it is reacted in the second step with the aromatic dicarboxylic acid or a derivative thereof.

The first step is preferably carried out in an anhydrous solvent. It can notably be a polar protic solvent (such as n-butanol, isopropanol, ethanol and methanol), a polar aprotic solvent (such as acetonitrile, DMAc and NMP) or a non polar solvent (such as chloroform, toluene and dichloroethane). The solvent is preferably a polar protic solvent, which may notably be selected from n-butanol, ethanol and methanol. Excellent results were obtained when using methanol.

Typically, the first step is carried out with an excess of the at least one aliphatic diamine preferably selected from those comprising 6 and 7 carbon atoms. The molar ratio of the di-ester of FDCA to the aliphatic diamine(s) selected from those comprising 6 and 7 carbon atoms is preferably from 0.70 to 0.95, more preferably from 0.75 to 0.85 and most preferably of about 0.8.

The first step is advantageously carried out at a temperature of at least 0° C., preferably at least 10° C., more preferably at least 20° C., still more preferably at least 30° C., even more preferably at least 40° C. On the other side, it was discovered that the first step should not be carried out at a temperature exceeding 100° C. Excellent results were obtained when using a temperature ranging from 45 to at most 60° C.

The first step is typically carried out for 30 minutes to 30 hours, preferably from 1 to 20 hours, more preferably from 5 to 15 hours.

Typically, the second step is carried out with an excess of the prepolymer. The molar ratio of the prepolymer obtained in the first step to the aromatic dicarboxylic acid(s) or a derivative(s) thereof is preferably from 1 to 1.5, more preferably from 1.01 to 1.10 and most preferably of about 1.05.

The first step is preferably carried out in the absence of the aromatic dicarboxylic acid or derivative thereof, different from the above mentioned FDCA.

The second step is advantageously carried out in the presence of a hindered amine The second step is preferably carried out in an anhydrous solvent. The solvent is preferably a polar aprotic solvent, which may notably be selected from dimethylformamide (DMF), dimethylacetamide (DMAc), and N-methylpyrrolidone (NMP). Excellent results were obtained when using DMAc.

The second step is advantageously carried out at a temperature of at least −10° C., preferably at least −5° C., more preferably at least 10° C., still more preferably at least 15° C., even more preferably at least 20° C. Excellent results were obtained when using a first temperature ranging from −10 to 10° C. for a time ranging from 5 minutes to 5 hours, preferably from 5 minutes to 1 hour, and then using a second temperature ranging from 0 to 60° C. for a time ranging from 1 hour to 48 hours.

The first and second steps can be carried out either simultaneously or subsequently.

When they are carried out subsequently, they can be carried out "one-pot", without isolating the prepolymer.

The prepolymer obtained in the first step has preferably a number average molecular weight (Mn) of at least 500 Da when determined by $^1$H-NMR, following the NMR method described in detail in the experimental section. The Mn is typically of at most 1500 Da. More preferably it is of at least 550 Da and at most 1450 Da.

The prepolymer obtained in the first step comprises typically at least 2 recurring units derived from the reaction of the di-ester of FDCA with at least one aliphatic diamine selected from those comprising 6 and 7 carbon atoms. Said prepolymer consists preferably of from 2 to 10 recurring units, preferably from 2 to 4, optionally end capped with at least one aliphatic diamine preferably selected from those comprising 6 and 7 carbon atoms.

The weight average molecular weight ($M_w$) is determined as follows:

$$M_w = \frac{\sum M_i^2 \cdot N_i}{\sum M_i \cdot N_i},$$

wherein $M_i$ is the discrete value for the molecular weight of a polymer molecule, $N_i$ is the number of polymer molecules with molecular weight $M_i$, then the weight of polymer molecules having a molecular weight $M_i$ is $M_i N_i$.

The polymer obtained at the end of the second step of the above detailed process step has a weight average molecular weight (Mw) of at least 25000 Da, preferably at least 30000 Da, more preferably at least 35000 Da when estimated by GPC, following the GPC method described in detail in the experimental section.

The process according to the present invention may optionally rise a third step where the obtained polyamide (P) is isolated and possibly purified.

The polyamide (P) may be isolated from the reaction medium by known techniques and in particular by precipitation. In particular, the reaction medium obtained at the end of the second step may be precipitated using polar protic solvents such as water or water/alcohol mixtures.

Then, a further precipitation of the polyamide (P) may optionally be carried out to improve the purity and/or the polydispersity index (PDI).

The polyamide (P) prepared according to the process of the present invention has advantageously a polydispersity index (PDI) of more than 1.0, preferably more than 1.5, and less than 3.5, and more preferably less than 2.5. For the purpose of the present invention, the polydispersity index (PDI) is hereby expressed as the ratio of weight average molecular weight ($M_w$) to number average molecular weight ($M_n$).

Still another aspect of the present invention relates to a composition, hereafter referred to as the polymer composition (C), comprising the above mentioned polyamide (P) and at least one other ingredient.

The at least one other ingredient is advantageously selected from the group consisting of at least another polymer, at least one reinforcing filler, mold release agents, lubricants, ultraviolet light stabilizers or UV blockers and optical brighteners.

The polymer composition (C) may further comprise at least another polymer, different from the above mentioned polyamide (P), such as polycarbonate, polyethylene glycol, polysulfone, polyesters, polyolefins, polyamideimide, polyimide, PTFE, aliphatic polyamides and aromatic polyamides such as polyphthalamide.

Non limitative examples of aromatic polyamides of the polymer composition (C), different from the polyamide (P) are: the polymer of adipic acid with meta-xylylene diamine (also known as PAMXD6 polymers, which are notably commercially available as IXEF® polyarylamides from Solvay Specialty Polymers U.S.A., L.L.C.), the polymers of phthalic acid, chosen among isophthalic acid (IA) and terephthalic acid (TA) and at least one aliphatic diamine such as 1,6-diaminohexane (notably commercially available as AMODEL® polyphthalamides from Solvay Specialty Polymers U.S.A., L.L.C.).

Non limitative examples of aliphatic polyamide polymer are notably selected from the group consisting of PA6, PA 6,6, PA10,10, PA6,10, copolyamide PA 6,6/6, PA 11, PA 12 and PA 10,12.

Other polymers may also be present in the polymer composition (C). For example, the polymer composition (C) can further contain one or more impact modifiers. The impact modifiers can be reactive with the polyamide (P) or non-reactive. In certain specific embodiment, the polymer composition (C) contains at least one reactive impact modifier and at least one non-reactive impact modifier.

Reactive impact modifiers that may be used include ethylene-maleic anhydride copolymers, ethylene-alkyl (meth)acrylate-maleic anhydride copolymers, ethylene-alkyl(meth)acrylate-glycidyl(meth)acrylate copolymers, and the like. An example of such reactive impact modifier is a random terpolymer of ethylene, methylacrylate and glycidyl methacrylate.

Non-reactive impact modifiers that may be blended into the polymer composition (C) generally include various rubber materials, such as acrylic rubbers, ASA rubbers, diene rubbers, organosiloxane rubbers, EPDM rubbers, SBS or SEBS rubbers, ABS rubbers, NBS rubbers and the like. Particular examples of non-reactive impact modifiers include ethyl butylacrylate, ethyl(methyl)acrylate or 2 ethyl hexyl acrylate copolymers.

If present, the impact modifier is preferably present in an amount of at least 2 wt %, more preferably at least 4 wt %, still more preferably at least 5 wt %, and most preferably at least 10 wt %, based on the total weight of the polymer composition (C). When present, the impact modifier is also preferably present in an amount of at most 20 wt %, more preferably at most 15 wt %, still more preferably at most 10 wt %, and most preferably at most 5 wt %, based on the total weight of the polymer composition (C).

When added to the polymer composition (C), the other polymer is preferably present in an amount of at least 1 wt %, preferably of at least 2 wt %, more preferably of at least 3 wt %, even more preferably of at least 4 wt %, and most preferably of at least 5 wt %, based on the total weight of the polymer composition (C). Besides, the other polymer is also preferably present in an amount of at most 20 wt %, preferably of at most 15 wt %, more preferably of at most 10 wt %, even more preferably of at most 9 wt %, and most preferably of at most 8 wt %, based on the total weight of the polymer composition (C).

The polymer composition (C) may also further comprise at least one reinforcing filler.

Reinforcing fillers are preferably fibrous. More preferably, the reinforcing filler is selected from glass fiber, carbon fiber, synthetic polymeric fiber, aramid fiber, aluminum fiber, titanium fiber, magnesium fiber, boron carbide fibers, rock wool fiber, steel fiber, wollastonite, etc. Still more preferably, it is selected from glass fiber, carbon fiber and wollastonite.

A particular class of fibrous fillers consists of whiskers, i.e. single crystal fibers made from various raw materials such as $Al_2O_3$, SiC, BC, Fe and Ni. Among fibrous fillers, glass fibers are preferred; they include chopped strand A-, E-, C-, D-, S- T- and R-glass fibers, as described in chapter 5.2.3, p. 43-48 of *Additives for Plastics Handbook*, 2nd ed., John Murphy.

In a preferred embodiment of the present invention the reinforcing filler is chosen from wollastonite and glass fiber. Excellent results were obtained when wollastonite and/or glass fibers were used. Glass fibers may have a round cross-section or an elliptic cross-section (also called flat fibers).

If present, the reinforcing filler is preferably present in an amount of at least 2 wt %, more preferably at least 4 wt %, still more preferably at least 5 wt %, and most preferably at least 10 wt %, based on the total weight of the polymer composition (C). When present, the reinforcing filler is also preferably present in an amount of at most 40 wt %, more preferably at most 30 wt %, still more preferably at most 25 wt %, and most preferably at most 20 wt %, based on the total weight of the polymer composition (C).

Excellent results were obtained when the reinforcing filler was present in the polymer composition (C) in an amount from about 5 to about 40 wt %, preferably from about 5 to about 25 wt %, and more preferably from about 10 to about 20 wt %, based on the total weight of the polymer composition (C).

The polymer composition (C) may also comprise other typical ingredients of polyamide compositions such as mold release agents, lubricants, ultraviolet light stabilizers or UV blockers optical brighteners and other stabilizers.

Still another aspect of the present invention is related to articles comprising the above mentioned polyamide (P) made from the polycondensation of monomers comprising from 15 to 80 mol % of 2,5-furandicarboxylic acid (FDCA), from 20 to 85 mol % of at least one aromatic dicarboxylic acid, and from 50 to 100 mol % of at least one aliphatic diamine selected from those comprising 6 and 7 carbon atoms. In particular, one may notably mention shaped articles, fibers, coatings, films and membranes comprising such a polyamide (P).

EXAMPLES

Materials and Methods

Methanol, Dimethylacetamide (DMAc) and Diisopropylethylamine (DIPEA) were purchased as anhydrous at Sigma-Aldrich and stored in a glove box.

Lithium Chloride was purchased as anhydrous and dried in an oven at 300° C. for a night and stored in a glove box.

Hexamethylenediamine (HMDA) was purchased at Sigma-Aldrich, purified by distillation and stored in a glove box.

Terephthaloyl chloride (TDC) and Isophthaloyl chloride (IDC) were purchased at Sigma-Aldrich, purified by distillation and stored in a glove box.

Dimethyl ester furan dicarboxylic acid (DMFDCA) was obtained from Avantium and stored in a glove box. All solvents were purchased from Sigma-Aldrich as HPLC grades.

All procedures were performed in an inert-dry atmosphere.

To determine the number average molecular weight of the prepolymers, $^1$H-NMR was used, while GPC was used to measure the weight average molecular weight of the final polymers. Those two methods were carried out as described below.

The glass transition temperatures (Tg) of the different polyamides were measured according to ASTM E1356 using a TA Instruments Model Q20/Q1000 Differential Scanning calorimeter and Liquid Nitrogen Cooling System operated with TA Thermal Advantage and Universal Analysis software. The instrument was calibrated using a heating and cooling rate of 20° C./min in nitrogen atmosphere. The measurements were also carried out using a heating and cooling rate of 20° C./min in nitrogen atmosphere. Two heating cycles were performed and the Tg was measured during 2nd heating cycle. Each Tg was determined by a certain construction procedure on the heat flow curve: a first tangent line to the curve above the transition region was constructed; a second tangent line to the curve below the transition region was also constructed; the temperature on the curve halfway between the two tangent lines, or ½ delta Cp, was the Tg reported in the tables below.

The melting temperatures (Tm) were determined by DSC, according to ASTM D3418.

The degradation temperatures (Td) were measured by Thermogravimetric Analysis (TGA) using a TA Instruments Q500 TGA. For this purpose, it was checked that the TGA was well-calibrated by means of a calibration sample. Then, the polymer of which the degradation temperature had to be measured was submitted to the following cycle: Heating from room temperature up to 800° C. at a rate of 10° C./min. As the polymer was heated, weight loss of the sample was monitored. The degradation temperature was determined by taking the first derivative of the weight loss curve versus temperature.

The polydispersity index (PDI) was calculated by dividing the ratio of weight average molecular weight ($M_w$) to the number average molecular weight ($M_n$).

The mechanical properties of molded parts from the polymers, were obtained following ASTM D 638 utilizing type V tensile bars.

Optimization of the Prepolymer Synthesis

The inventors discovered that a high amount of N-methylation occurred during polymerization conditions. The amount of N-methylation seems to be directly linked to the demethylation of the DMFDCA moieties. The inventors have thus studied the influence of various parameters in the outcome of the polymerization of DMFDCA with HMDA, as it may be seen from Table 1, following the procedure detailed hereafter:

Under an inert atmosphere, were added to a septum capped 30 mL glass vial 1.00 gram (5.4 mmol) of DMFDCA, 0.69 gram (5.9 mmol, 1.1 eq.) of HMDA and 1.7 ml (1.0 volume eq.) of anhydrous methanol in a closed vial under inert atmosphere the suspension was heated in an oil bath at 50° C. for 3 hours.

After 3 hours a nitrogen stream was applied through the overhead of the vial and the heating of the oil bath was increased to 80° C. in order to remove the methanol by distillation. A white solid appeared within 30 minutes and was isolated before being further dried for 19 h at 50° C. under vacuum to yield the prepolymer.

A sample was prepared for NMR analysis by dissolving 10 mg of the prepolymer in 0.6 mL of TFA-d. The $^1$H-NMR spectrum was recorded on a Bruker BioSpin GmbH instrument at a frequency of 500 MHz. The FID data file from the $^1$H-NMR measurement was Fourier transformed to a standard frequency domain spectrum using SpinWorks 3.1.8.3 software. The residual TFA signal was set at 11.500 ppm.

The integral value of the furan signal at 7.41 ppm was set to 2.000, all other signals were then integrated. From these integral values the relative amounts (%) of methyl ester, carboxylic acid, N-methylated compounds and primary amine were calculated as follows:

% ester=(integral at 4.11 ppm/3)*100%

% acid=(integral at 7.55 ppm)*100%

% N-methyl=((integral at 2.98 ppm+integral at 3.07 ppm+integral at 3.22 ppm)/3)*100%

% amine=(integral at 3.30 ppm/integral at 3.65 ppm) *100

TABLE 1

Study of the reaction of DMDFCA with HMDA

| Equivalent HMDA | temperature | time | solvent | % ester | % acid | % N-methyl | % amine |
|---|---|---|---|---|---|---|---|
| 1.10 | 80 | 5 h | MeOH | 1.41 | 1.98 | 1.61 | 12 |
| 1.10 | 70 | 3 h | MeOH | 4.73 | 0.74 | 0.53 | 12 |
| 1.10 | 50 | 3 h | MeOH | 7.50 | 0.75 | 0.79 | 14 |
| 1.10 | 50 | 1 h | none | 8.23 | 1.18 | 1.54 | 24 |
| 1.02 | 50 | 19 h | MeOH | 10.30 | 0.32 | 0.27 | 6 |
| 1.25 | 50 | 3 h | none | 5.60 | 0.00 | 0.18 | 22 |
| 1.25 | 50 | 19 h | MeOH | 0.58 | 0.17 | 0.11 | 25 |
| 1.25 | 70 | 3 h | MeOH | 1.50 | 0.44 | 0.29 | 26 |
| 1.25 | 120 | 1 h | MeOH | 0.22 | 2.66 | 2.32 | 25 |

As it may be seen from the results shown in table 1, the best results were obtained when using a temperature of 50° C., allowing complete conversion, using lower excesses of the diamine while maintaining the N-methylation rate low. This temperature has thus been used thereafter to synthesize the prepolymer.

General Procedure for the Determination of Mn of the Prepolymers Using NMR

The Mn of the amine terminated prepolymer was calculated from the % amine value determined by the above listed $^1$H-NMR method according to the following formula: Mn=116+((100/% amine)*236)

General Procedure for the Synthesis of Diamine-DMFDCA Prepolymer

To a 250 mL round bottom flask was added 20.0 gram (108.6 mmol) of DMFDCA, 15.7 gram (135.7 mmol, 1.25 eq.) of HMDA, 36.0 mL of anhydrous methanol, and equipped with a magnetic stir bar. The flask was capped with a rubber septum and transferred into a fume hood. The closed system was heated at 50° C. overnight with stirring. The next day a waxy white solid was obtained. This solid was crushed into small particles and dried overnight in a vacuum oven at 50° C. The final product was a white solid yield 28.1 grams (100% yield). The prepolymer was analyzed by $^1$H-NMR in TFA-d. The prepolymer had a Tg of 77° C. observed via DSC.

General Procedure for the Synthesis of Furanic Polyamides

Example 1 was made as follows: to a 100 mL round bottom flask under a inert atmosphere was added 1.50 gram (1.41 mmol) of a prepolymer obtained from the condensation of HMDA and DMFDCA (hereinafter the 6F-prepolymer), 17 mL of anhydrous DMAc, 0.3015 gram (7.11 mmol, 5.0 eq.) of LiCl, 0.75 mL (4.30 mmol, 3.0 eq.) of DIPEA, and equipped with a magnetic stir bar. The inert system was stirred at room temperature until most of the prepolymer was dissolved. The resultant mixture was cooled to 0° C. In a separate 10 mL round bottom flask, TDC (0.27 gram, 1.34 mmol, 0.95 eq.) (or IDC) and 2 mL of anhydrous DMAc were added under an inert atmosphere. The solution was swirled until all of the monomer was dissolved. The solution was transferred into an air tight syringe. The TDC solution was injected all at once into the prepolymer solution and allowed to react at 0° C. for 10 min while maintaining an inert atmosphere. The reaction mixture was allowed to come to room temperature and stirred for 48 hrs. The solution was precipitated slowly into water using the high setting on a Waring blender. The solids were filtered and collected on a Buchner funnel. The solids were combined with hot water and washed in the warring blender on high for 1 minute. This process was repeated 3×. The resultant polymer powder was dried in a vacuum oven at 50° C. overnight to yield 1.4 gram (82% yield) of a white solid. The polymer was analyzed by $^1$H-NMR in TFA-d. The other prepolymer obtained from the condensation of HMDA, DMFDCA and TDC (hereinafter the 6FT polyamide) and the prepolymer obtained from the condensation of HMDA, DMFDCA and IDC (hereinafter the 6FI polyamide) of examples 2-8 were made using the same procedure with different amounts of the prepolymer and the TDC or IDC and the required amount of additional diamine.

General Procedure for the Determination of Molecular Weight of the Furanic Polyamides Using GPC Pump: Waters 515 solvent delivery system, or equivalent
Detector: Waters 2487 series UV/VIS detector, or equivalent at 254 nm
Software: Waters Empower Pro Gel Permeation Chromatography software or equivalent
Injector: Waters 717 Plus Auto sampler or equivalent
Flow rate: 1.0 ml/min
UV detection: 254 nm
Column temperature: Ambient
Column: Two mini mixed-B columns, 10 µm particles, 250×4.6 mm, Agilent Technologies
Injection: 10µ liter
Runtime: 30 minutes
Eluent: Hexafluoroisopropanol with 0.05M sodium trifluoroacetate
Calibration standard: Broad calibration standard (AMODEL" A-1002, N1028-2 broad calibration standard is internally developed and molecular weights for this sample, determined by SEC with a light-scattering detector and NMR, ($M_W$=27,943 and $M_N$=9,340)
Concentration of calibration standard: 5 to 6 mg/mL
Calibration Curve:
1) Type: Relative, Broad calibration standard calibration
2) Fit: $2^{rd}$ order regression.
Integration and calculation: Empower Pro GPC software manufactured by Waters used to acquire data, calibration and molecular weight calculation. Peak integration start and end points are manually determined from significant difference on global baseline.

Sample Preparation: 25 to 35 mg of polymer was dissolved in 5 ml of eluent by shaking the mixture until the polymer is fully dissolved. Solution was filtered using a 0.45-µm PTFE syringe filter and the resulting solution was passed through to GPC column according to the GPC conditions mentioned above.

TABLE 2

Synthesis and Characterization of Furanic Polyamides.

| Example Number | EX 1 | EX 2 | EX 3 | EX 4 | EX 5 | EX 6 | EX 7 | EX 8 |
|---|---|---|---|---|---|---|---|---|
| Composition | 6FT 80:20 | 6FT 75:25 | 6FT 65:35 | 6FT 50:50 | 6FT 25:75 | 6FI 75:25 | 6FI 50:50 | 6FI 25:75 |
| Mw (Da) | 38675 | 31506 | 37056 | 40740 | 28429 | 30159 | 23759 | 40024 |
| Mn (Da) | 7073 | 6838 | 7025 | 6503 | 4432 | 6621 | 5431 | 6333 |
| PDI | 5.5 | 4.6 | 5.3 | 6.3 | 6.4 | 4.5 | 4.4 | 6.3 |
| Tg (° C.) | 138 | 143 | 138 | 144 | 148 | 136 | 131 | 133 |
| Tm (° C.) | — | — | 287 | 336 | 360 | — | — | — |
| Td (° C.) | 405 | 429 | 405 | 415 | 415 | 429 | 436 | 439 |

General Procedure for the Purification of Furanic Polyamides

In a 20 mL sample vial was added 48 mg of the furanic polyamide obtained using the above mentioned general procedure for the synthesis of furanic polyamides. A solution of HFIP/DCM 20/80 (0.85 mL) was added and the sample was dissolved. An additional 0.15 mL of DCM was added to bring the total volume to 1 mL. The solution was vigorously stirred while 2.75 mL of MeOH was slowly added. The solution was stirred for an additional 30 min. The solids were allowed to settle to the bottom and the solvent was decanted from the top. The solids were washed with 5 mL of DCM for 30 min and again decanted. This process was repeated 3×. The polymer was dried in a vacuum oven at 70° C. overnight. 23 mg of polymer was recovered for a yield of 48% (see Table 3 Example 1a).

Alternatively the solution can also be purified using NMP to dissolve the polymer and DCM to precipitate it from solution. In a 20 mL sample vial was added 98 mg of polymer. The polymer was dissolved in 1 mL of NMP. The solution was vigorously stirred while 2.5 mL of DCM was added slowly. The solution was stirred for an additional 30 min. The solids were allowed to settle to the bottom and the solvent was decanted from the top. The solids were washed with 5 mL of DCM for 30 min and again decanted. This process was repeated 3 times. The polymer was dried in a vacuum oven at 70° C. overnight. 42 mg of polymer was recovered for a yield of 43% (see Table 3 Example 1b).

TABLE 3

Purification of Furanic Polyamides via Precipitation.

| Example number | EX 1 | EX 1a | EX 1b |
|---|---|---|---|
| Composition | 6FT 80:20 | 6FT 80:20 | 6FT 80:20 |
| Mw (Da) | 38675 | 54850 | 57399 |
| Mn (Da) | 7073 | 21536 | 33518 |
| PDI | 5.5 | 2.5 | 1.8 |

General Procedure for the Melt Processing and Molding of Semi-Crystalline Furanic Polyamides The polymer of Example 9, prepared according to the above mentioned procedures was processed on the DSM Xplore Microcompounder and mini injection system. The barrel temperature was set to 300° C. with a subsequent melt temperature of 280° C. The polymer was kept in the barrel until a steady state was reached on the torque reading of the screws, typically ~2 minutes, to ensure that the polymer was completely melted and flowing. After that time, the polymer was loaded into a handheld transfer barrel (heated to 300° C.) and placed into the mini injector. Small type V tensile bars were molded from the polymer. Tensile bars were tested following ATSM D638. Its properties are summarized in Table 4, Example 9.

General Procedure for the Melt Processing and Molding of Amorphous Furanic Polyamides The polymer of Example 10, also prepared according to the above mentioned procedures was processed on the DSM Xplore Microcompounder and mini injection system using the same procedure described above for the semi-crystalline furanic polyamides, except that the temperature of the barrel was set to 270° C., with a subsequent melt temperature of 250° C., and that the polymer was loaded into a handheld transfer barrel (heated to 250° C.). Its properties are summarized in Table 4, Example 10.

Comparison with Commercially Available Polyamides

Grilamid® TR90 is an amorphous polyamide, commercially available from EMS-GRIVORY, was used in Example 11. Zytel® 330 is another amorphous polyamide, commercially available from DuPont, was used in Example 12. Reported data were taken from corresponding datasheets (ISO 527 was used to generate mechanical data).

TABLE 4

Mechanical Properties of Furanic Polyamides

| Example Number | EX 9 | EX 10 | EX 11 | EX 12 |
|---|---|---|---|---|
| Composition | 6FT 50:50 | 6FT 75:25 | | |
| Mw (Da) | 20446 | 21823 | | |
| Mn (Da) | 2881 | 5011 | | |
| Tg (° C.) | 136 | 140 | 155 | 127 |
| Tm (° C.) | 268 | — | — | — |
| Td (° C.) | 435 | 448 | | |
| Elongation @ Yield (%) | 6.1 | 7.3 | 6.0 | 6.0 |
| Tensile Strength @ Break (%) | 61 | 43 | 60 | 97 |
| Modulus of Elasticity (GPa) | 2.8 | 2.5 | 1.6 | 2.4 |

Example 9 is a semi-crystalline polyamide presenting an exceptional modulus of elasticity.

Examples 10-12 are all amorphous polyamides.

The adjustment of parameters such as the ratios of the monomers and the Mw of the polymers allow the fine tuning of the thermal and mechanical properties of the polymers according to the invention.

In particular, one should mention the high melting temperatures of the semi-crystalline furanic polyamides obtained (from 268 to 360° C.), compared to the low melting temperatures disclosed in the prior art (see for example CN 102311546A), making them suitable for high temperature environment applications.

Example 10, according to the present invention, features a very high modulus of elasticity combined to a very good elongation at yield, when compared to the two other amorphous polyamides of Examples 11 and 12.

The polyamides of the present invention feature thus interesting thermal and mechanical properties while also presenting the extraordinary benefit of being made from bio-sourced monomers.

The invention claimed is:

1. A polyamide made from the polycondensation of monomers comprising:
   (i) a dicarboxylic acid component comprising:
       from 15 to 80 mol % of 2,5-furandicarboxylic acid (FDCA) or derivative thereof,
       from 20 to 85 mol % of at least one aromatic dicarboxylic acid or derivative thereof, different from said FDCA, based on the total number of moles of dicarboxylic acids, and
   (ii) a diamine component comprising from 50 to 100 mol %, based on the total number of moles of diamines, of at least one aliphatic diamine selected from those comprising 6 and 7 carbon atoms,
   wherein the polyamide has a melting temperature, determined by DSC, according to ASTM D3418, from 268 to 360° C.

2. The polyamide according to claim 1, wherein the dicarboxylic acid component comprises a derivative of FDCA.

3. The polyamide according to claim 1, wherein the dicarboxylic acid component comprises a derivative of the aromatic dicarboxylic acid.

4. The polyamide according to claim 1, wherein the at least one aromatic dicarboxylic acid is a phthalic acid selected from the group consisting of isophthalic acid (IA), and terephthalic acid (TA).

5. The polyamide according to claim 1, wherein the dicarboxylic acid component comprises at least 20 mol % of FDCA, based on the total number of moles of dicarboxylic acids.

6. The polyamide according to claim 1, wherein the dicarboxylic acid component comprises at most 80 mol % of FDCA, based on the total number of moles of dicarboxylic acids.

7. The polyamide according to claim 1, wherein the at least one aliphatic diamine is 1,6-diaminohexane.

8. The polyamide according to claim 1, wherein at least one aliphatic diamine selected from those comprising 6 and 7 carbon atoms, is present in at least 80 mol %, based on the total number of moles of diamines.

9. A process for making the polyamide of claim 1 comprising a step where the FDCA or any of its derivatives and the at least one aliphatic diamine or any of its derivatives are reacted together at a temperature of at most 100° C. to obtain a prepolymer.

10. The process according to claim 9, wherein the process comprises two distinct steps:
    in a first step, a prepolymer is synthesized where the FDCA or any of its derivatives and the at least one aliphatic diamine or any of its derivatives are reacted together at a temperature of at most 100° C. to obtain a prepolymer; and
    in a second step, the prepolymer obtained in the first step is reacted with the aromatic dicarboxylic acid or a derivative thereof to obtain the final polyamide.

11. The process according to claim 9, wherein dimethyl ester of 2,5-furandicarboxylic acid is reacted with the at least one aliphatic diamine or any of its derivatives.

12. A polymer composition comprising the polyamide of claim 1 and at least one other ingredient.

13. The polymer composition according to claim 12, wherein the at least one other ingredient is selected from the group consisting of at least another polymer, at least one reinforcing filler, mold release agents, lubricants, ultraviolet light stabilizers or UV blockers optical brighteners.

14. An article comprising the polyamide of claim 1.

15. The article according to claim 14 being selected from the group consisting of shaped articles, fibers, coatings, films and membranes.

* * * * *